United States Patent [19]

Levko

[11] Patent Number: 5,048,356
[45] Date of Patent: Sep. 17, 1991

[54] WOBBLE DEVICE

[76] Inventor: Leo Levko, 146 West 79th St., New York, N.Y. 10024

[21] Appl. No.: 513,120

[22] Filed: Apr. 23, 1990

[51] Int. Cl.$^5$ .............................................. F16H 33/10
[52] U.S. Cl. ............................................. 74/60; 74/86
[58] Field of Search ................. 74/64, 86, 60; 185/27; 290/1 R

[56] References Cited

U.S. PATENT DOCUMENTS

| 244,799 | 7/1881 | Dye | 74/60 |
|---|---|---|---|
| 460,736 | 10/1891 | Williams et al. | 185/27 |
| 492,962 | 3/1893 | Kinkead | 74/86 |
| 988,508 | 4/1911 | Reynolds | 290/4 R |
| 1,659,238 | 2/1928 | Boyce | 74/60 |
| 2,402,224 | 6/1946 | Elberty | 74/60 |
| 2,913,911 | 11/1959 | Gilkey | 74/60 |
| 3,231,749 | 4/1963 | Hinck | 290/53 |
| 3,774,048 | 11/1973 | Hardingham | 290/42 |
| 4,161,889 | 7/1979 | Hinds | 74/64 X |
| 4,266,143 | 5/1981 | Ng | 290/53 |
| 4,423,334 | 12/1983 | Jacobi | 290/53 |
| 4,667,115 | 5/1987 | Cadwell | 290/54 |
| 4,915,196 | 4/1990 | Krisko | 185/27 |

FOREIGN PATENT DOCUMENTS 1090379 3/1955 France .................................. 74/60

Primary Examiner—Leslie A. Braun
Assistant Examiner—Scott Anchell

[57] ABSTRACT

A wobble device is provided including a circular platform, a structure for pivoting the platform to achieve a wobbling movement, a shaft transverse to and positioned in a center of the platform, a moveable carriage rotatably attached through an arm to the shaft, a roller structure for moving the carriage on an upper surface of the platform, and a support frame below the platform. A forcing structure attached to a plurality of extension members downwardly directs the platform tilting an end of the platform toward the support frame. As the platform inclines towards the forcing structure, the carriage also begins to rotate. Once in motion, only a minimum amount of electrical energy is needed to maintain the wobble. As the carriage rotates, it turns a spur gear system attached to the center shaft. This rotational movement is then transferred through the gear mechanism to an armature of an electrical generator fastened to the platform upper surface. Electrical energy generated thereby is returned to the system thereby minimizing energy consumption required to operate the wobble device.

21 Claims, 3 Drawing Sheets

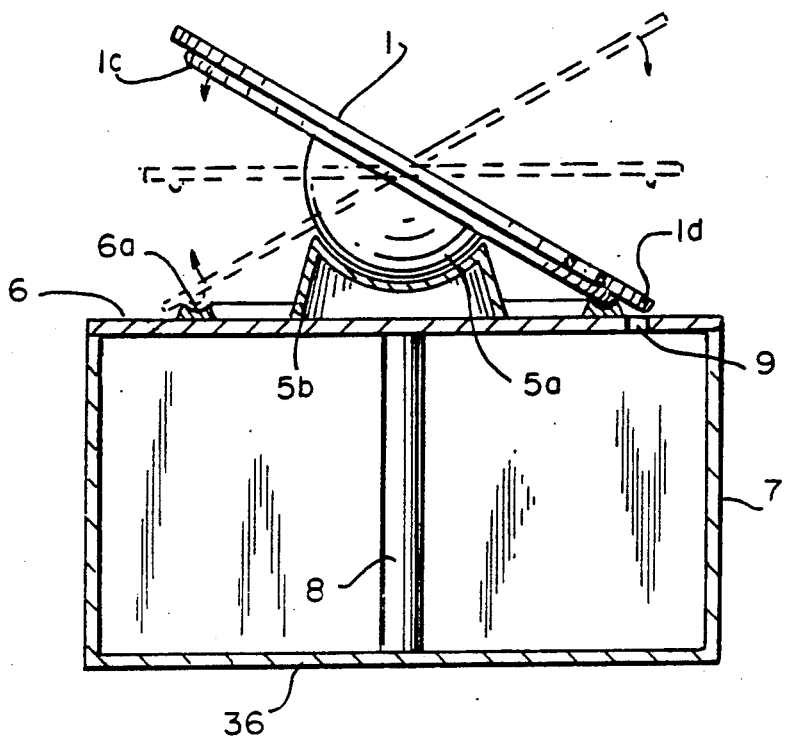
FIG. 4
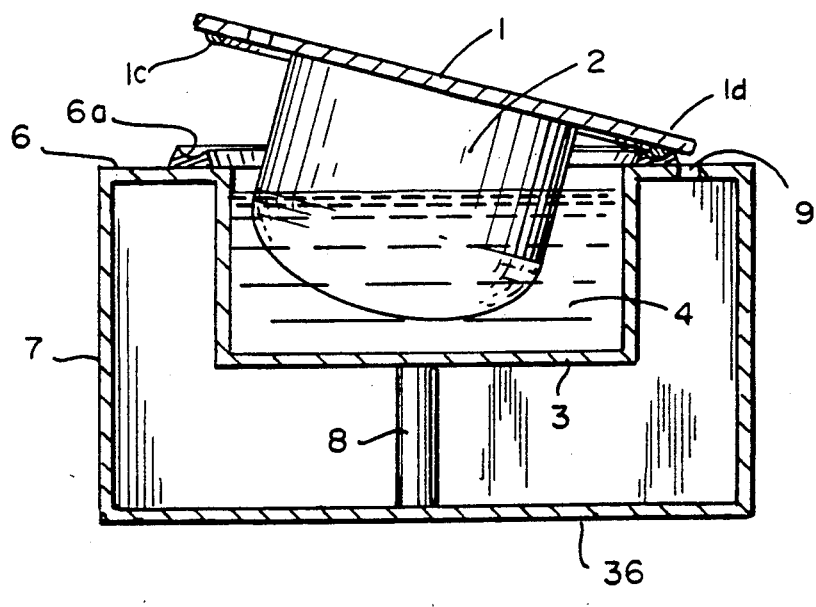
FIG. 5
FIG 6a
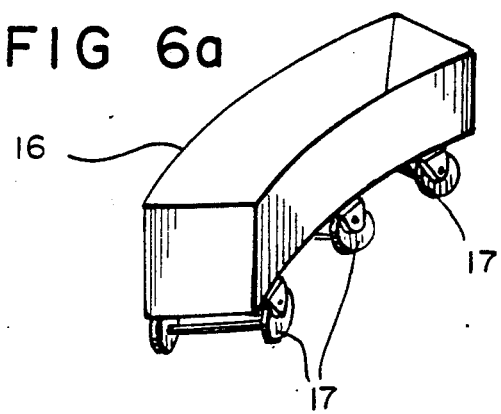
FIG. 6b
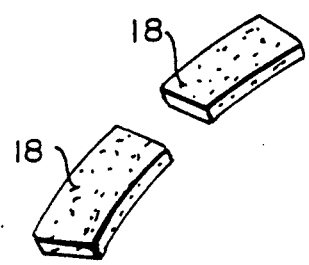

WOBBLE DEVICE

FIELD OF THE INVENTION

The invention relates to a wobbling platform device requiring a very low energy input.

BACKGROUND OF THE INVENTION

Devices generating a wobbling, rotational motion have a variety of useful applications. For instance, these devices may serve as platforms for lighthouse beacons or radar antennas. Often these beacons or antennas are situated in remote locations where there is no electrification. Portable generators or batteries would be the only feasible power sources. Under such conditions, it becomes important that rotational motion be accomplished with minimum power input.

A wobbling, rotational motion device may also find utility in processes requiring agitation. Testing laboratories often must evaluate products for stability. Continuous agitation devices are utilized for this purpose. Energy efficient systems for agitation would be advantageous.

Conversion of eccentric gravitational movement into rotational movement has been reported in Japanese Patent 56-44472.

U.S. Pat. No. 988,508 (Reynolds) discloses a wave power system which utilizes large vanes submerged in water beneath a fixed platform. These vanes are mounted on vertical rods which they rotate under the force of the waves. The rods in turn rotate pumps through crank connections. By this system, wave forces are converted to an alternate type mechanical energy.

U.S. Pat. No. 3,231,749 (Hinck) reports an enclosed buoy which will bob under the influence of the waves. Within the buoy, an offset weight is mounted on a vertical shaft and will rotate about the shaft, carrying a knurled wheel which engages a circular rack to operate a generator. In a simplified embodiment, the offset weight rotates a vertical shaft which is connected at its upper end through a ratchet arrangement to a spring which stores the energy and then drives a generator.

U.S. Pat. No. 3,774,048 (Hardingham) illustrates a system where an offset weight is mounted on a gear which is connected by a gear train to a generator. A ratchet arrangement in the gear train causes the generator to be driven in the same direction regardless of the direction in which the weighted gear is turning under the pitch and roll of a vessel in which the device is mounted.

U.S. Pat. No. 4,423,334 (Jacobi) reports a buoy containing an electrical generator. The generator comprises an inverted pendulum having two windings formed at the free end thereof and aligned to articulate between two end stops, each provided with a magnetic circuit. As loops pass through the magnetic circuit, electric current is induced which charges a battery. Pendulum movement arises through action of the waves.

U.S. Pat. No. 4,266,143 (Ng) is another disclosure on the utilization of ocean wave movement to produce electricity. The apparatus is contained in a tank adapted to float in water tilting from side to side about a pivot point located below the tank. A pendulum-like motion results. This motion causes a plurality of gravity wheels to roll on a respective platform around a central shaft. A series of such platforms are stacked one upon another. Electrical generators are connected to the rotating shafts.

A number of problems arise from the above-described devices. First there is the necessity for access to ocean water. This requirement cannot be met in all locations. Further, water and especially saline are highly corrosive toward metal equipment. Another disadvantage is that ocean wave movement can often be of non-uniform intensity. Equipment must be designed to cope with such non-uniformity.

Of course, there have been rotating devices capable of practice on land. Illustrative is U.S. Pat. No. 4,667,115 (Cadwell) which describes a machine converting electricity, air pressure, centrifugal force and gravity into hydraulic pressure. A plurality of wheels are driven by an electric motor along a slotted table surface. When thus rolled across, levers located in the slots are depressed and in turn activate hydraulic pistons.

OBJECTS OF THE INVENTION

It is, therefore, an object of this invention to provide a device that will create a steady, speed-controlled, uni-directional wobble movement.

It is also an object of this invention to provide a device that will achieve rotational motion with only minimal electrical energy input.

It is another object of this invention to provide a device that will achieve wobble movement without dependence on ocean wave movement.

SUMMARY OF THE INVENTION

These objects and others which will become more readily apparent hereinafter are attained in accordance with the wobble device of this invention.

A wobble device is provided comprising a circular platform, means for pivoting the platform to achieve a wobbling movement, a shaft transverse to and positioned at the center of the platform, a moveable carriage rotatably attached through an arm to the shaft, roller means for moving said carriage on an upper surface of the platform, and a support frame below the platform.

The device, in one embodiment, may further comprise a plurality of means for forcing the platform downwardly toward the frame, the forcing means having one end connected to the platform and a second end to a gear assembly. Any excess mechanical energy can be recycled into the motor of the gear assembly or transmitted outside the device system.

Means for pivoting the platform to obtain wobbling motion may be embodied through a ball and socket arrangement, through placement of the wobble platform in a pool of water or through use of a pivot point fulcrum.

Advantageously, the moveable carriage is capable of holding one or more weights. The carriage may be rectangular or even curved in conformance to the curve of the platform. Likewise, the weights are correspondingly rectangular or curved to snugly fit within the carriage. A suitable roller means includes wheels, ball bearings or wheels on rails.

In the wobble producing mechanism described herein, forcing means may be selected from cable, chain or rope.

BRIEF DESCRIPTION OF THE DRAWING

The above features and advantages of this invention will become more readily apparent from the following specific description, reference being made to the accompanying highly diagrammatic drawing in which:

FIG. 4 is a side, cross-sectional view of one possible design of a portion of the device depicting its rotational movement;

FIG. 5 is a side, cross-sectional view of another possible design of a portion of the device;

FIG. 6a is a perspective view of a carriage as used in FIG. 2; and

FIG. 6b is a perspective view of weights to be placed in the carriage of FIG. 6a.

DETAILED DESCRIPTION

Figure 1:
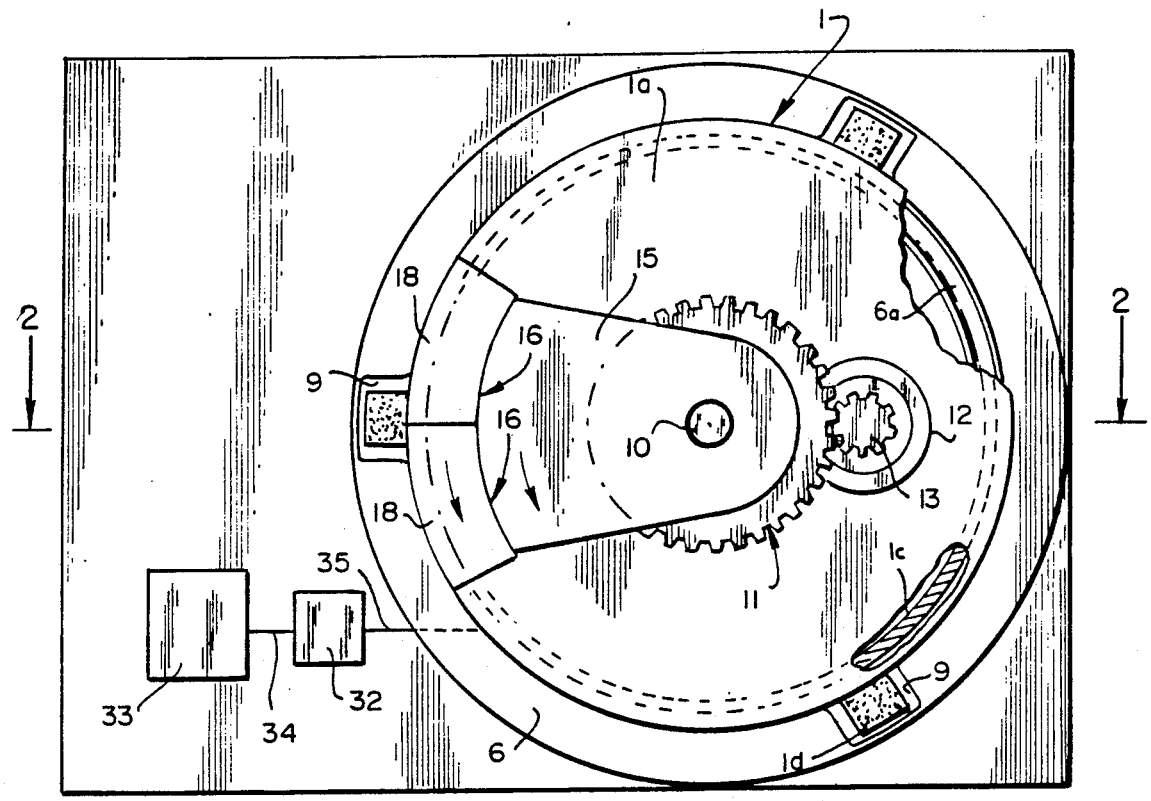
FIG. 1 is a top partially cut-away view of one embodiment of the wobbling device.

A wobble movement in the platform of the device can be produced by either placing the platform (a) in a pool of (fresh) water; (b) on a ball/socket structure; or (c) over a pivot point fulcrum. Option (a) is preferable for larger units. Wobble created by option (b) can be produced by several methods using push or pull systems. A simple effective pull mechanism is demonstrated hereinbelow and through the drawings.

FIGS. 1-4 depict one embodiment of the wobble device. A circular platform 1 supports a shaft (or column) 10 on its upper surface 1a. Shaft 10 is perpendicularly mounted in the center of 1a. Evenly spaced along the circumference of the platform are at least three extension elements 1d, best viewed in FIG. 1. The three elements serve to minimize the force needed to induce platform wobble based on the principle of fulcrum action and leverage. The extension elements clear the platform through opening 9, that also accesses pull cable 28.

A moveable carriage 16 is rigidly connected to an arm 15, that is rotatably supported by shaft 10. The carriage is capable of holding a plurality of weight units 18, formed into various shapes and comprising lead, cement, rocks or other ballast material. Preferably, the units are contoured to fit snugly into the carriage and FIG. 6b exemplifies the units 18.

Roller means 17 in the form of three wheel sets are attached to the bottom of the carriage. Of course, the number of wheel sets may be varied. Ball bearings or wheels on rails may alternatively be employed as roller means. Arm 15 is rigidly attached to carriage 16 and rotatably supported by shaft 10 so that the former rotates as the latter travels its circumferential course.

Attached to upper surface 1a there may optionally be an electrical generator 12. Counterweights 14 may be affixed to the platform lower surface 1b as counterbalance to the generator weight. Gear means communicate rotational motion to generator 12. The gear means comprises a center spur gear 11 meshing with a smaller gear 13 associated with a generator armature shaft 12a. Electric cable 30a is threaded through a top part of center shaft 10. A loop 30b is formed by the cable after it leaves the top part of center shaft 10 to allow leeway for the wobbling movement of the platform, and continues as 30c. Electric cable 30a,b,c links conducting carbons 29 on the generator armature to the outside and, in part, to servo assembly 32 via electric cable 31. Line 30d delivers the generated electric current for outside consumption, e.g. to electrical outlet 37. Thus, any excess mechanical wobbling energy is efficiently conserved.

A mechanical means for pivoting the platform to achieve a wobbling movement is positioned in the center of platform 1 on its lower surface 1b. A hydraulic means, as shown in FIG. 5, will yield the same results. The mechanical means to achieve the wobble movement in the platform is exemplified by a semi-circular sphere 5a, freely rotatable in socket 5b. Shaft 8 helps to support socket 5b from below. Shaft 8 is also used to hold gear 22 through its opening 8a. Socket 5b is mounted on support structure 6. A circular, concave structure 6a is integral with support structure 6 and mates with circular rim 1c. This serves to help keep platform 1 raised up over opening 9 to clear extension element 1d and to keep float means 2 of FIG. 5 in liquid 4 from drifting. A wall or column(s) 7 supports structure 6. The entire assembly is mounted on base 36. Sphere 5a is rigidly attached to lower surface 1b. The socket/sphere arrangement can also be inverted, i.e. socket on top and sphere at bottom.

Figure 3:
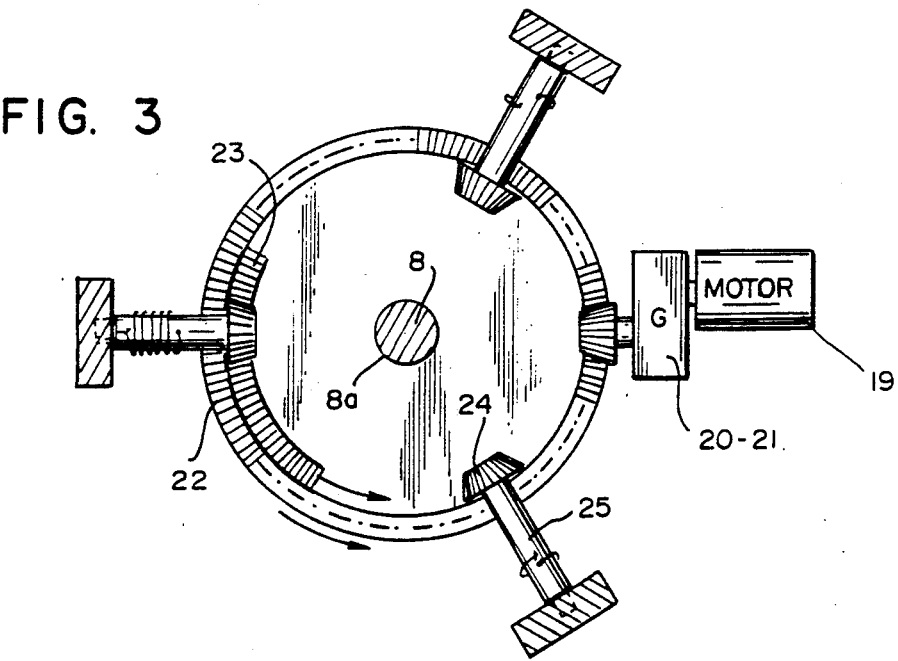
FIG. 3 is a top cross-sectional view along line 3—3 of FIG. 2.

Tied to each extension element 1d is a means for forcing platform 1 downwardly. Forcing means may be selected from cables, ropes, chains, elastic material, but could also be made of springs and even piston/cylinders. The forcing means or cable 28, at its second end, through opening 9 is secured onto bar 25, integral with bevel gear 24 that mates with an interrupted gear segment 23. Bevel gear 24/shaft 25 is rotatably held in: (a) mounting 26 integral with 7, and (b) a mounting integral with support structure 27. Gear segment 23 extends over an arc of not more than 120 degrees. FIG. 3 best illustrates the arrangement. A circular gear 22 supports and is integral with the gear segment 23.

Electric motor 19 is wired to activate gear 22 via a speed reducer 20 and gear 21 that mates with 22. Generator set 33 is linked via electrical cable 34, servo assembly 32 and electrical cable 35 to electric motor 19. The generator 33 is preferably powered by a gasoline or diesel driven engine.

Operation of the wobble device begins with start-up of the low power generator 33. Power supplied from the generator is transmitted to servo assembly 32 via cable 34, which, through an electrical cable 35, energizes electric motor 19. This motor then activates gear 22 via speed reduction assembly 20-21 to move circular gear 22. As previously noted, gear 22 has an additional, but interrupted bevel gear segment 23 with an arc of less than 120 degrees. Segment 23 is mounted on the top surface of 22. Intermittantly, each of the three bevel gears 24, mounted on respective bars 25, will be engaged by the interrupted gear segment 23. Every time a gear 24 engages with the interrupted gear segment 23, a cable or chain or the like, attached to extension elements 1d and through opening 9, to shaft 25, will be wound around the shaft and consequently be shortened proportionately, thus pulling the platform 1 down on its side. This rhythmic cycle repeats for as long as the electric motor 19 is running. A steady wobbling movement of the platform arises through the rhythmic cycling.

The steady, uni-directional platform wobble, equivalent to a constant down-hill movement, will cause the weighted carriage 16 to freely rotate around center shaft 10. Integral with and below the arm 15 is spur gear 11 which meshes with smaller gear 13 causing armature shaft 12a to be driven. It is to be noted that center spur gear 11 is activated from the platform periphery rather than from the center shaft. Torque is thereby greatly reduced and the power of gear 11 increased as a result of the leverage.

Electric current produced by the generator 12 is tapped by carbons 29 and conducted by electric cable 30a up and out through shaft 10. When the cable exits shaft 10, it coils, as shown in 30b, to accommodate the wobbling platform in its movement. The cable then returns electric current back to the servo assembly 32 via cable 31. Alternatively, some power may also leave the system through cable 30d.

Figure 2:
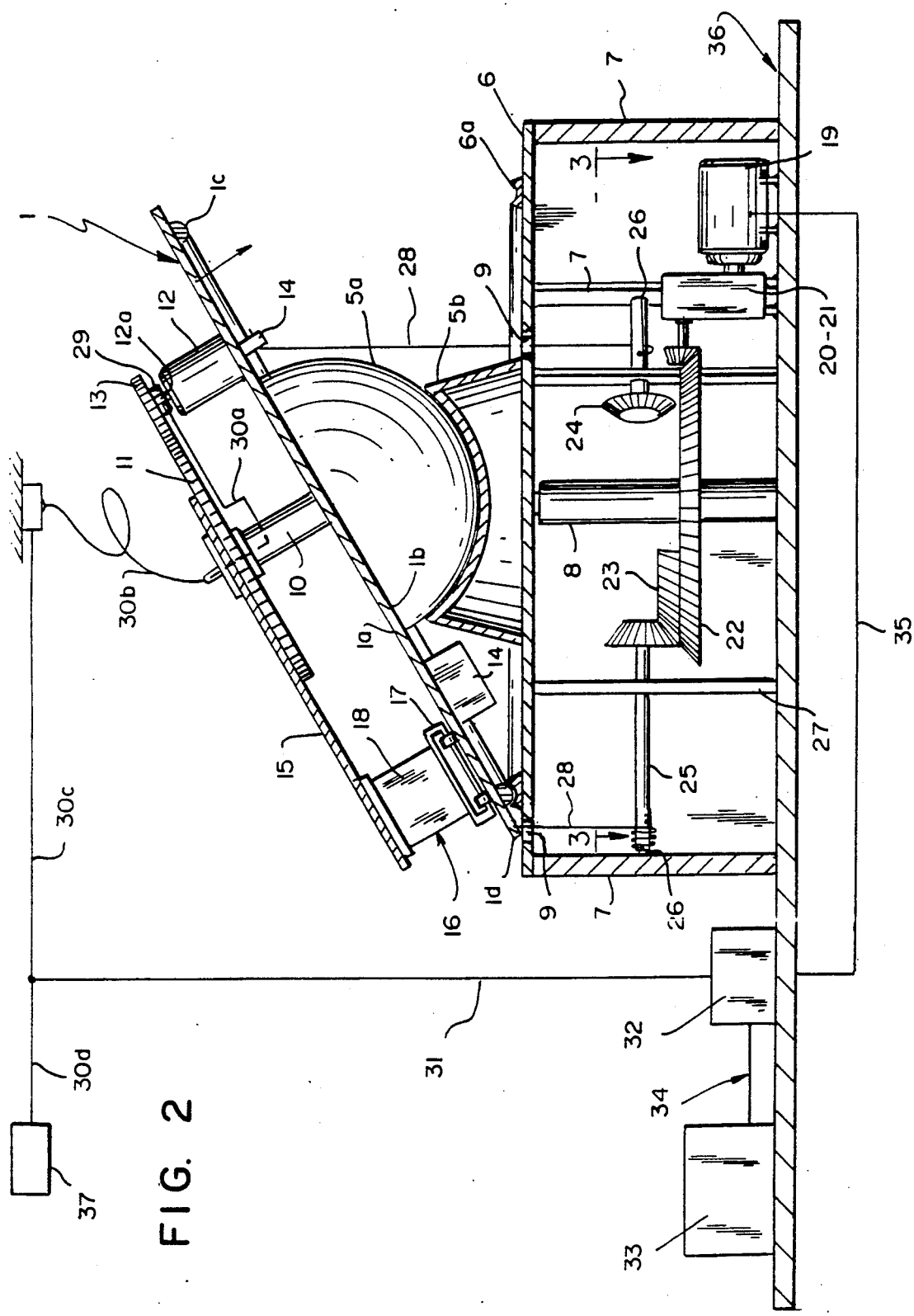
FIG. 2 is a side, partial cross-sectional view along line 2—2 of the embodiment shown in FIG. 1.

From the foregoing description one can appreciate the principle behind the device of this invention. In FIG. 2, platform 1 is supported by a center structure providing means for pivoting the platform, i.e. a ball and socket arrangement. Absent the weighted carriage, the platform would be in balance and positioned horizontally. By applying the rotatable carriage to a periphery of the platform, the latter will tip in the direction of the carriage movement. Thereby a portion of the platform edge comes to rest against a supporting frame structure 6. A small amount of power applied to the pull cable and delivered to the platform via the leverage increasing extension 1d induces a tilt of the platform to the cable. Wheeled carriage 16 then starts to move toward the same direction to accommodate the inclined platform. As the carriage begins to roll toward the pull point, it picks up momentum thereby helping to generate the wobble motion.

What is claimed is:

1. A wobble device comprising:
   a circular platform;
   means for pivoting said platform to achieve a wobbling movement;
   a shaft transverse to and positioned in a center of said platform;
   a moveable carriage rotatably attached through an arm to said shaft;
   roller means for moving said carriage on an upper surface of said platform, said roller means connected to said carriage;
   a support frame below said platform; and
   a plurality of extension elements evenly distributed around and outwardly directed from said platform.

2. A device according to claim 1 further comprising a plurality of means for forcing said platform downwardly in a wobbling movement toward said support frame, said forcing means having one end connected to said platform and a second end to a gear assembly.

3. A device according to claim 2 further comprising a motor to drive said gear assembly.

4. A device according to claim 2 wherein said forcing means are selected from the group consisting of cable, chain and rope.

5. A device according to claim 1 wherein said means for pivoting said platform comprises a ball and socket arrangement.

6. A device according to claim 1 wherein said for pivoting said platform comprises a buoyant structure, floating in a liquid, held in a tank.

7. A device according to claim 1 wherein said means for pivoting said platform comprises a pivot point fulcrum.

8. A device according to claim 1 wherein said carriage is capable of holding one or more weights.

9. A device according to claim 1 wherein said roller means are wheels.

10. A device according to claim 9 wherein said platform has a rail system to accommodate said wheels.

11. A device according to claim 1 wherein said roller means are ball bearings.

12. A device according to claim 1 further comprising at least one counterweight mounted on a bottom surface of said platform.

13. A device according to claim 1 further comprising an electrical generator mounted on said upper surface of said platform.

14. A device according to claim 13 further comprising gear means for transferring energy created by the wobbling movement to said generator.

15. A device according to claim 14 wherein said arm is integral with at least a part of said gear means.

16. A wobble device comprising:
    a circular platform;
    means for pivoting said platform to achieve a wobbling movement, said pivoting means comprising a buoyant structure, floating in a liquid, held in a tank;
    a shaft transverse to and positioned in a center of said platform;
    a moveable carriage rotatably attached through an arm to said shaft;
    roller means for moving said carriage on an upper surface of said platform, said roller means connected to said carriage; and
    a support frame below said platform.

17. A wobble device comprising:
    a circular platform;
    means for pivoting said platform to achieve a wobbling movement;
    a shaft transverse to and positioned in a center of said platform;
    a moveable carriage rotatably attached through an arm to said shaft;
    roller means for moving said carriage on an upper surface of said platform, said roller means connected to said carriage, said roller means being wheels and said platform having a rail system to accommodate said wheels; and
    a support frame below said platform.

18. A wobble device comprising:
    a circular platform;
    means for pivoting said platform to achieve a wobbling movement;
    a shaft transverse to and positioned in a center of said platform;
    a moveable carriage rotatably attached through an arm to said shaft;
    roller means for moving said carriage on an upper surface of said platform, said roller means connected to said carriage of said roller means being ball bearings; and
    a support frame below said platform.

19. A wobble device comprising:
    a circular platform;
    means for pivoting said platform to achieve a wobbling movement;
    a shaft transverse to and positioned in a center of said platform;
    a moveable carriage rotatably attached through an arm to said shaft;
    roller means for moving said carriage on an upper surface of said platform, said roller means connected to said carriage;
    a support frame below said platform; and a plurality of means for forcing said platform downwardly in a wobbling movement toward said support frame, said forcing means having one end connected to said platform and a second end to a gear assembly having a gear shaft, said forcing means being selected from the group consisting of cable, chain and rope, said forcing means being capable of winding intermittingly around said gear shaft.

20. A wobble device comprising:

a circular platform;

means for pivoting said platform to achieve a wobbling movement;

a shaft transverse to and positioned in a center of said platform;

a moveable carriage rotatably attached through an arm to said shaft;

roller means for moving said carriage on an upper surface of said platform, said roller means connected to said carriage;

a support frame below said platform; and at least one counterweight mounted on a bottom surface of said platform.

21. A wobble device comprising:

a circular platform;

means for pivoting said platform to achieve a wobbling movement;

a shaft transverse to and positioned in a center of said platform;

a moveable carriage rotatably attached through an arm to said shaft;

roller means for moving said carriage on an upper surface of said platform, said roller means connected to said carriage;

a support frame below said platform; and an electrical generator mounted on said upper surface of said platform.

* * * * *